United States Patent [19]

Yasuda et al.

[11] Patent Number: 5,686,543
[45] Date of Patent: Nov. 11, 1997

[54] PROCESS FOR PRODUCING POLYBUTADIENE RUBBER

[75] Inventors: Kyouyu Yasuda, Tsu; Akio Takashima, Kameyama, both of Japan

[73] Assignee: Japan Synthetic Rubber Co., Ltd., Tokyo, Japan

[21] Appl. No.: 655,676

[22] Filed: May 30, 1996

[30] Foreign Application Priority Data

Jun. 15, 1995 [JP] Japan ................................. 7-171560

[51] Int. Cl.$^6$ .................. C08F 4/80; C08F 2/06; C08F 136/06
[52] U.S. Cl. .................. 526/133; 526/119; 526/137; 526/139; 526/142; 526/143; 526/169.1; 526/340.4
[58] Field of Search ..................... 526/119, 122, 526/133, 137, 139, 142, 143, 34.04, 169.1

[56] References Cited

U.S. PATENT DOCUMENTS

| 3,624,000 | 11/1971 | Throckmorton | 526/122 X |
| 3,684,789 | 8/1972 | Yagi et al. | 526/142 X |
| 3,732,195 | 5/1973 | Throckmorton | 526/122 X |
| 3,816,567 | 6/1974 | Yagi et al. | 526/138 X |
| 3,843,618 | 10/1974 | Yagi et al. | 526/138 |
| 3,844,974 | 10/1974 | Throckmorton | 526/122 X |
| 4,096,322 | 6/1978 | Throckmorton | 526/133 |

FOREIGN PATENT DOCUMENTS

| 55-17059 | 5/1980 | Japan. |
| 61-73707 | 4/1986 | Japan. |
| 63-1335 | 1/1988 | Japan. |
| 3-45609 | 2/1991 | Japan. |
| 4-23643 | 4/1992 | Japan. |
| 5-9228 | 1/1993 | Japan. |

OTHER PUBLICATIONS

Pavlos Hadjiandreou, et al., "Butadiene 1,4–Polymerization Initiated by Bis[(n$^3$–ally)(trifluoroacetato)nickel]: A Perfectly Living Coordination System", Macromolecules, vol. 17, (pp. 2455–2456), 1984.

M. C. Throckmorton, "Butadiene Polymerization with Nickel Compounds: Effect of Cocatalysts", J. Appl. Poly. Sci., vol. 42, (pp. 3019–3024), 1991.

M. C. Throckmorton, et al., "An HF–Nickel–R$_3$AL Catalyst System for Producing High cis–1,4–Polybutadiene", Rubber Chem. Tech., vol. 45, (pp. 268–277), 1972.

Primary Examiner—Fred Teskin
Attorney, Agent, or Firm—Oblon, Spivak, McClelland, Maier & Neustadt, P.C.

[57] ABSTRACT

A process for producing a polybutadiene rubber having a cis-1,4 content of 94% or more, a ratio of weight average molecular weight to number average molecular weight of 2.5 to 3.5 as measured by a gel permeation chromatography and a Mooney viscosity ($ML_{1+4}$, 100° C.) of 20 to 100, which process comprises polymerizing 1,3-butadiene in an inert organic solvent with a catalyst comprising as the main components (a) a nickel compound; (b) a specific fluorine compound; (c) a trialkylaluminum; and (d) a halogenated aldehyde and/or a quinone compound. The use of the specific catalyst enables the production in a high yield of a polybutadiene rubber which maintains the abrasion resistance, high impact resilience and low heat buildup which are the characteristics of polybutadiene rubber and has a small die swell when extruded in the form of a blend with a natural rubber and is excellent in physical properties of vulcanizate.

19 Claims, No Drawings

PROCESS FOR PRODUCING POLYBUTADIENE RUBBER

BACKGROUND OF THE INVENTION

This invention relates to a process for producing a polybutadiene excellent in processibility and physical properties.

Polybutadienes have heretofore been used in blend with natural rubber in tire uses making the best use of their characteristics including abrasion resistance, high impact resilience, low-temperature properties, flex resistance, low rolling resistance and the like. Among them, a high cis-1, 4-polybutadiene rubber having a high cis-1,4 content (referred to hereinafter as the high cis-polybutadiene rubber in some cases) is superior in abrasion resistance, high impact resilience and low rolling resistance to a low cis-1,4-polybutadiene rubber having a low cis-1,4 content. As a catalyst for producing the high cis-polybutadiene rubber, there have been known nickel, cobalt, titanium, rare earth element compounds and the like. The high cis-polybutadiene rubber produced using a nickel catalyst system is superior in roll retention to those obtained using a cobalt catalyst system and a titanium catalyst system. However, a further improvement in extrusion processibility has been desired.

For making small the die swell which serves as an indication of the extrusion processibility, there has heretofore been proposed a polybutadiene rubber in which syndiotactic 1,2-polybutadiene crystals are dispersed in the high cis-polybutadiene rubber (see Japanese Patent Application Kokoku (JP-B) Nos. 63-1335; and 55-17059 and Japanese Patent Application Kokai (JP-A) Nos. 61-73707; and 3-45609). However, this polybutadiene rubber is disadvantageous in that the impact resilience thereof is lower than those of conventional high cis-polybutadiene rubbers because of containing crystal components, and is not satisfactory in tire performance.

A polybutadiene rubber whose molecular weight distribution has been narrowed using a nickel catalyst system has also been proposed (see Japanese Patent Application Kokai (JP-A) No. 5-9228). This polybutadiene exhibits excellent processibility and physical properties, but is disadvantageous in that a large amount of the catalyst must be used for the production thereof in a high yield (polymerization activity=$0.7 \times 10^4$ g of polymer/g of Ni·hr). Moreover, Macromol., 17, 2455 (1984) discloses that a Ni(O) complex catalyst enables the living polymerization of 1,3-butadiene and the addition of chloranil results in an improvement in polymerization activity. However, the improved polymerization activity is no more than $0.1 \times 10^4$ g of polymer/g of Ni·hr, and the cis content is also low.

SUMMARY OF THE INVENTION

This invention has been made against a background of the above-mentioned problem of prior art and aims at providing a process for producing a polybutadiene rubber having a high cis-1,4 content in a high yield by use of a specific catalyst in which rubber the abrasion resistance, high impact resilience and low heat-buildup which are the characteristics of said polybutadiene rubber are maintained and which rubber exhibits, even when used in the form of a blend with a natural rubber, a small die swell at the time of extrusion processing and excellent physical properties of vulcanizate.

According to this invention, there is provided a process for producing a polybutadiene rubber having a cis-1,4 content of 94% or more, a ratio of weight average molecular weight to number average molecular weight of 2.5 to 3.5 as measured by a gel permeation chromatography and a Mooney viscosity ($ML_{1+4}$, 100° C.) of 20 to 100, which process comprises polymerizing 1,3-butadiene with a catalyst comprising as the main components (a) a nickel compound, (b) at least one fluorine compound selected from the group (1) hydrogen fluoride or its complex compounds, (2) boron trifluoride or its complex compounds, (3) metal salts or organic derivatives of hexafluorophosphoric acid, (4) metal salts or organic derivatives of hexafluoroantimonic acid and (5) metal salts of tetrafluoroboric acid, (c) a trialkylaluminum and (d) a halogenated aldehyde and/or a quinone compound in an inert organic solvent.

DETAILED DESCRIPTION OF THE INVENTION

The nickel compound (a) used in the catalyst of this invention is specifically an organic nickel compound soluble in an organic solvent, and an organic acid salt of nickel is a representative thereof. Specific examples of the nickel compound (a) include organic acid salts of nickel such as nickel naphthenate, nickel formate, nickel octanate, nickel stearate, nickel citrate, nickel benzoate, nickel toluate and the like; organic complex compounds of nickel such as nickel acetylacetonate and the like; nickel alkylbenzenesulfonates; and the like. Among them, preferable nickel compounds (a) are nickel naphthenate, nickel octanate and nickel stearate.

Also, carboxylated nickel oxyborate compounds represented by the following structural formula (I) can be used:

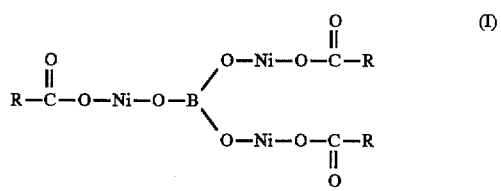

wherein R represents an alkyl group having 7 to 17 carbon atoms.

Specific examples of the fluorine compounds (b) include hydrogen fluoride and its complex compounds such as benzonitrile hydrogenfluoride and the like; boron trifluoride and its complex compounds such as boron trifluoride butyl etherate, boron trifluoride ethyl etherate and the like; metal salts or organic derivatives of hexafluorophosphoric acid such as triphenylmethyl hexafluorophosphate and the like; metal salts or organic derivatives of hexafluoroantimonic acid such as triphenylmethylhexafluoroantimonic acid salt and the like; tetrafluoroboric acid salts such as nickel fluoroborate and the like; etc.

These fluorine compounds (b) can be used alone or in admixture of two or more.

The trialkylaluminum (c) includes trimethylaluminum, triethylaluminum, triisobutylaluminum, tri-n-butylaluminum, trihexylaluminum and the like.

Moreover, the component (d) includes halogenated aldehydes such as acetyl chloride, butyryl chloride, chloral and the like; quinone compounds such as chloranil, tetrafluorobenzoquinone, p-quinone, naphthoquinone, anthraquinone, 2,3-dichloro-1,4-naphthoquinone, 2,3-dichloro-5,6-dicyanobenzoquinone and the like.

Incidentally, the amount of the catalyst used in this invention is as follows: the component (a) is used in a proportion of 0.01 to 1 millimole, preferably 0.02 to 0.5 millimole, as metal atom per 100 g of 1,3-butadiene. When the proportion of the component (a) is less than 0.01 millimole, the polymerization reaction does not start in some cases, while when the proportion of the component (a) exceeds 1 millimole, a high molecular weight polymer is not obtained in some cases, so that these proportions are not desirable.

The amount of the fluorine compound (b) used is 0.05 to 20 millimoles, preferably 0.2 to 10 millimoles, per 100 g of, 1,3-butadiene.

Moreover, the amount of the trialkylaluminum used is 0.05 to 10 millimoles, preferably 0.2 to 5 millimoles, per 100 g of 1,3-butadiene.

Furthermore, the amount of the component (d) used is 0.01 to 10 millimoles preferably 0.02 to 6 millimoles, per 100 g of 1,3-butadiene. When the amount of the component (d) is less than 0.01 millimole, there is a case where the molecular weight distribution represented by the ratio of weight average molecular weight to number average molecular weight (Mw/Mn) becomes large, while when the amount exceeds 10 millimoles, the polymerization activity becomes remarkably low, so that such amounts are not desirable.

The catalyst used in this invention comprises the above components (a) to (d) as the main components, and it is particularly preferable that the component (d)/the component (a) (mole ratio) is within the range of 0.5 to 10. When the component (d)/the component (a) (mole ratio) is less than 0.5, the molecular weight distribution (Mw/Mn) becomes large in some cases, while when the ratio exceeds 10, the polymerization activity becomes remarkably low, so that such ratios are not desirable. The component (d)/the component (a) (mole ratio) is particularly preferably 1 to 6.

The catalyst used in this invention is prepared by mixing the catalyst components in any order, preferably the order of (a)→(b)→(c)→(d); (a)→(c)→(b)→(d); (d)→(a)→(c)→(b); or (d)→(a)→(b)→(c). Incidentally, the catalyst may be previously prepared by mixing the components before contact with 1,3-butadiene or may be prepared in situ by mixing the components in the presence of 1,3-butadiene in a polymerizer.

In this invention, 1,3-butadiene is polymerized in an inert organic solvent using a catalyst comprising the above components (a) to (d) as the main components.

As the polymerization solvent, there are used inert organic solvents, for example, aromatic hydrocarbon solvents such as benzene, toluene, xylene, cumene and the like; aliphatic hydrocarbon solvents such as n-pentane, n-hexane, n-butane and the like; alicyclic hydrocarbon solvents such as methylcyclopentane, cyclohexane and the like; and mixtures of them. Preferable are n-hexane, n-heptane, cyclohexane, toluene and xylene.

The polymerization temperature is preferably 20° C. to 100° C., more preferably 40° C. to 80° C.

The polymerization pressure is 0 to 5 atmospheres (gauge pressure). The polymerization reaction may be carried out batchwise or continuously.

Incidentally, the monomer concentration in the solvent is preferably 5 to 50% by weight, more preferably 10 to 35% by weight.

In order to prevent the polymerization reaction from being deactivated at the start of and during the polymerization, it is necessary to pay attention so as to make the amount of a compound having a deactivating function such as oxygen, carbon dioxide gas or the like incorporated into the polymerization system as small as possible.

When the polymerization reaction has proceeded to the desired stage, to the reaction mixture are added an alcohol or another polymerization terminator, an age resistor, an antioxidant, an ultraviolet absorber or the like, and thereafter, the polymer produced is separated from the mixture, washed and dried in a conventional manner to obtain the objective polybutadiene rubber.

According to the production process of this invention, the use of a specific catalyst enables the production of a polybutadiene rubber having a high cis-1,4 content and a sharp molecular weight distribution. Thus, the polybutadiene rubber obtained with a catalyst comprising the components (a) to (d) as the main components has a cis-1,4 content of 94% or more and a Mw/Mn ratio of 2.5 to 3.5.

When the cis-1,4 content of the polybutadiene rubber obtained in this invention is less than 94%, the impact resilience becomes inferior and hence such cis-1,4 contents are not desirable. The cis-1,4 content is preferably 95% or more. The control of this cis-1,4 content can be easily conducted by controlling the polymerization temperature.

In this invention, the synthesis of a polybutadiene rubber having a Mw/Mn ratio of less than 2.5 is difficult because the polymerization activity becomes remarkably low. On the other hand, when the Mw/Mn ratio exceeds 3.5, the die swell becomes large, and hence, such Mw/Mn ratios are not desirable. The control of this Mw/Mn ratio can be easily conducted by controlling the mole ratio of the component (d) to the component (a).

Incidentally, the ratio of solution viscosity SV of a 5.23% by weight polybutadiene rubber solution in toluene to Mooney viscosity MV ($ML_{1+4}$, 100° C.), namely SV/MV, is preferably 4 or more, more preferably 4.2 or more. When the ratio is less than 4, the die swell becomes large, and hence, such ratios are not desirable.

The molecular weight of the polybutadiene rubber obtained by the process of this invention can be varied in a wide range; however, the polystyrene-reduced weight average molecular weight of the polybutadiene rubber is preferably 100,000 to 1,000,000, more preferably 400,000 to 800,000. When it is less than 100,000, the polybutadiene rubber becomes a liquid polymer, while when it is more than 1,000,000, such problems are caused that the polybutadiene rubber becomes inferior in processiblity, it receives an excessive torque when kneaded on a roll or in a Banbury mixer, the resulting compounded rubber has a high temperature and hence is deteriorated, the dispersion of carbon black in the polybutadiene rubber becomes bad, and hence, the performance of the vulcanized rubber is inferior. Hence, such weight average molecular weights are not desirable.

When the polybutadiene rubber obtained by the production process of this invention is used particularly as an industrial rubber article, its Mooney viscosity ($ML_{1+4}$, 100° C.) should be in the range of 20 to 100, preferably 30 to 70, and for the same reason as in the case of the weight average molecular weight, when the Mooney viscosity is less than 20, the physical properties of the vulcanized rubber is inferior, while when the Mooney viscosity exceeds 100, the processiblity becomes inferior.

The polybutadiene rubber obtained by the production produce of this invention is used as a raw rubber alone or in the form of a blend with other synthetic rubbers or natural rubbers.

In particular, the polybutadiene rubber obtained in this invention exhibits, when blended with a natural rubber, a remarkable improvement effect on extrusion processibility, and when the polybutadiene rubber/natural rubber blend ratio (weight ratio) is 30 to 70/70 to 30, the blend exhibits a low die swell value.

A blend rubber in which the polybutadiene rubber obtained by the production process of this invention is blended with a natural rubber and/or a synthetic rubber may be compounded with a reinforcing agent, a softening agent, an age resistor, a cross-linking agent, a cross-linking coagent or the like and the resulting compound may be used as a rubber composition.

The reinforcing agent includes carbon black, white carbon, talc, calcium carbonate, clay and the like; the softening agent includes naphthenic oils, aromatic oils, paraffinic oils and the like; the age resistor includes those of the amine type, phenol type and the like; the cross-linking agent includes sulfur, sulfur-containing compounds and the like; and the cross-linking coagent includes vulcanization accelerators of the thiazole type, thiuram type and the like.

The polybutadiene rubber obtained by the production process of this invention can be employed in rubber uses which require mechanical characteristics and abrasion resistance, for example, tire, hose, belt and other various industrial articles.

According to this invention, there can be obtained a polybutadiene rubber in a high yield which has excellent physical properties of vulcanizate particularly when blended with a natural rubber and which has a dimension stability when extruded and is useful as a tire material.

DESCRIPTION OF THE PREFERRED EMBODIMENTS

Examples are shown below to explain this invention in more detail; however, this invention should not be construed to be limited thereto.

In the Examples, parts and % are by weight unless otherwise specified.

In the Examples, various measurements were conducted in the following methods:

Mooney Viscosity ($ML_{1+4}$, 100° C.)

Using a SMV-200 type Mooney machine manufactured by Shimadzu Corp., a solution was pre-heated at 100° C. for one minute using an L type rotor and then a value after a lapse of 4 minutes was measured.

Cis-1,4 Content

Measured by use of a FT/IR-7300 type infrared spectrophotometer manufactured by Japan Spectroscopic Co. Ltd. and calculated by the Morero method.

Solution Viscosity (SV)

The viscosity of a 5.23% polybutadiene rubber solution was measured at 30° C. using a Canon Fenske viscometer.

Molecular Weight of Polybutadiene

Measured under the following conditions using HLC-8129 type gel permeation chromatograph manufactured by TOSOH CORP.:

Column: GMH-HXL 2 Columns

Flow rate: 1 ml/sec

Sample concentration: 0.01 g/20 ml

Eluent: Tetrahydrofuran

Measuring temperature: 40° C.

Die Swell

A rubber composition was extruded at 100° C. under a load of 100 kg using a CFT-500 type flow tester manufactured by Shimadzu Corp. and the change of length after the extrudate was allowed to stand for a predetermined time was measured and indicated as an index to the shrinkage in Comparative Example 1 assumed as 100. The larger the index, the smaller the shrinkage and the better the die swell.

Tensile Test of Vulcanized Rubber

Measured in accordance with JIS K6301.

Impact Resilience

Measured at 50° C. using an impact resilience tester manufactured by Dunlop Company.

Abrasion Resistance

A wear (cc/min) was measured at a slip ratio of 40% using a Lambourn type abrasion tester and the abrasion resistance is indicated as an index to the wear of the vulcanizate in Comparative Example 1 assumed as 100. The larger the index, the abrasion resistance the better.

Example 1

In a 5-liter autoclave purged with nitrogen was placed 2,500 g of dehydrated and purified toluene, and then, 500 g of 1,3-butadiene was placed therein and the resulting mixture was maintained at 25° C.

Separately, 0.046 millimole of nickel naphthenate, 0.5 millimole of boron trifluoride ethyl etherate (referred to hereinafter as merely the boron trifluoride in some cases) and 0.42 millimole of triethylaluminum were placed in a shlenk purged with nitrogen, and were aged at 20° C. for 20 minutes. The entire amount of the aged catalyst solution was placed in the above autoclave and then 0.07 millimole of chloranil was added thereto to start polymerization.

After the start of polymerization, the polymerization temperature was adjusted to 60° C. and the polymerization system was stirred for 2 hours, after which methanol was added to the polymerization mixture to terminate the polymerization.

Subsequently, 2.5 g of 2,4-butyl-p-cresol in the form of a toluene solution was added to the polymerization mixture and thereafter the solvent was removed, after which the residue was dried on a hot roll at 120° C.

A polybutadiene was obtained in an amount of 450 g, the polymerization activity was $8.33 \times 10^4$ g of polymer/g of Ni·hr, the Mooney viscosity was 45, the cis-1,4 content was 95.5%, the solution viscosity (SV) was 212 cps, the number average molecular weight (Mn) was 193,000, the weight average molecular weight (Mw) was 646,000 and the Mw/Mn ratio was 3.3.

Using the polybutadiene obtained, a rubber composition having the following compounding recipe was obtained and then subjected to evaluation of physical properties. The results obtained are shown in Tables 1 and 2.

| Compounding recipe | |
| --- | --- |
| Natural rubber (Mooney viscosity = 80) | 50 parts |
| Polybutadiene rubber | 50 parts |
| FEF carbon black | 50 parts |
| Aromatic oil | 15 parts |
| Zinc flower No. 1 | 3 parts |
| Stearic acid | 2 parts |
| Antigen 3C*[1] | 3 parts |
| Sunceller NS*[2] | 0.8 parts |
| Sulfur | 1.5 parts |

Note:
*[1]: N-phenyl-N'-isopropyl-p-phenylenediamine
*[2]: N-t-Butyl-2-benzothiazolyl sulfenamide Example 2

In the same manner as in Example 1, except that the amount of boron trifluoride ethyl etherate was changed to 0.52 millimole and the amount of triethylaluminum was changed to 0.35 millimole, polymerization was conducted to obtain 410 g of a polybutadiene.

The polymerization activity was $7.59 \times 10^4$ of polymer/g of Ni·hr, the Mooney viscosity was 63, the cis-1,4 content was 95.8%, the solution viscosity (SV) was 511 cps, the number average molecular weight (Mn) was 245,000, the weight average molecular weight (Mw) was 806,000, and the Mw/Mn ratio was 3.3.

The polybutadiene obtained was subjected to evaluation of physical properties in the same manner as in Example 1 to obtain the results shown in Tables 1 and 2.

Example 3

In the same manner as in Example 1, except that the amount of chloranil was changed to 0.023 millimole, polymerization was conducted to obtain 460 g of a polybutadiene.

The polymerization activity was $8.52\times10^4$ g of polymer/g of Ni·hr, the Mooney viscosity was 42, the cis-1,4 content was 95.5%, the solution viscosity (SV) was 180 cps, the number average molecular weight (Mn) was 180,000, the weight average molecular weight was 620,000, and the Mw/Mn ratio was 3.4

The polybutadiene obtained was subjected to evaluation of physical properties in the same manner as in Example 1 to obtain the results shown in Tables 1 and 2.

Example 4

In the same manner as in Example 1, except that the amount of boron trifluoride ethyl etherate was changed to 0.69 millimole, the amount of triethylaluminum was changed to 0.46 millimole and 2,3-dichloro-1,4-naphthoquinone was substituted for the chloranil, polymerization was conducted to obtain 450 g of a polybutadiene.

The polymerization activity was $8.33\times10^4$ g of polymer/g of Ni·hr, the Mooney viscosity was 40, the cis-1,4 content was 95.4%, the solution viscosity (SV) was 170 cps, the number average molecular weight (Mn) was 188,000, the weight average molecular weight (Mw) was 573,000, and the Mw/Mn ratio was 3.0.

The polybutadiene obtained was subjected to evaluation of physical properties in the same manner as in Example 1 to obtain the results shown in Tables 1 and 2.

Example 5

In the same manner as in Example 1, except that the amount of triethylaluminum was changed to 0.35 millimole and 0.28 millimole of p-quinone was substituted for the chloranil, polymerization was conducted to obtain 390 g of polybutadiene.

The polymerization activity was $7.22\times10^4$ g of polymer/g of Ni·hr, the Mooney viscosity was 51, the cis-1,4 content was 95.4%, the solution viscosity (SV) was 230 cps, the number average molecular weight (Mn) was 207,000, the weight average molecular weight (Mw) was 686,000, and the Mw/Mn ratio was 3.3.

The polybutadiene obtained was subjected to measurement of physical properties in the same manner as in Example 1 to obtain the results shown in Tables 3 and 4.

Example 6

In the same manner as in Example 1, except that the chloranil was added before the addition of the aged catalyst solution and the amount of the chloranil was changed to 0.09 millimole, polymerization was conducted to obtain 440 g of a polybutadiene.

The polymerization activity was $8.15\times10^4$ g of polymer/g of Ni·hr, the Mooney viscosity was 42, the cis-1,4 content was 95.5%, the solution viscosity (SV) was 175 cps, the number average molecular weight (Mn) was 170,000, the weight average molecular weight (Mw) was 540,000 and the Mw/Mn ratio was 3.2.

The polybutadiene obtained was subjected to evaluation of physical properties in the same manner as in Example 1 to obtain the results shown in Tables 3 and 4.

Example 7

In the same manner as in Example 1, except that chloral was substituted for the chloranil, polymerization was conducted to obtain 250 g of a polybutadiene.

The polymerization activity was $4.63\times10^4$ g of polymer/g of Ni·hr, the Mooney viscosity was 62, the cis-1,4 content was 95.8%, the solution viscosity (SV) was 500 cps, the number average molecular weight (Mn) was 262,000, the weight average molecular weight (Mw) was 786,000, and the Mw/Mn ratio was 3.0.

The polybutadiene obtained was subjected to evaluation of physical properties in the same manner as in Example 1 to obtain the results shown in Tables 3 and 4.

Comparative Example 1

In the same manner as in Example 1, except that the chloranil was not added, polymerization was conducted to obtain 470 g of a polybutadiene.

The polymerization activity was $8.7\times10^4$ g of polymer/g of Ni·hr, the Mooney viscosity was 44, the cis-1,4 content was 95.5%, the solution viscosity (SV) was 150 cps, the number average molecular weight (Mn) was 144,000, the weight average molecular weight (Mw) was 580,000 and the Mw/Mn ratio was 4.0.

The polybutadiene obtained was subjected to evaluation of physical properties in the same manner as in Example 1 to obtain the result shown in Tables 3 and 4.

Comparative Example 2

In the same manner as in Example 1, except that the amounts of nickel naphthenate, boron trifluoride ethyl etherate, triethylaluminum and chloranil were changed to 0.51 millimole, 5.54 millimoles, 4.66 millimoles and 0.776 millimole, respectively, and the polymerization time was changed to ten minute, polymerization was conducted to obtain 500 g of a polybutadiene.

The polymerization activity was $9.26\times10^4$ g of polymer/g of Ni·hr, the Mooney viscosity was 15, the cis-1,4 content was 95.2%, the solution viscosity (SV) was 75 cps, the number average molecular weight (Mn) was 66,000, the weight average molecular weight (Mw) was 205,000 and the Mw/Mn ratio was 3.1.

The polybutadiene obtained was subjected to evaluation of physical properties in the same manner as in Example 1 to obtain the results shown in Tables 5 and 6.

Comparative Example 3

Polymerization was conducted in the method stated in Example 1 of Japanese Patent Application Kokai (JP-A) Hei 5(1993)-9228 to obtain 420 g of a polybutadiene.

The polymerization activity was $0.7\times10^4$ g of polymer/g of Ni·hr, the Mooney viscosity was 44, the cis-1,4 content was 95.5%, the solution viscosity (SV) was 214 cps, the number average molecular weight (Mn) was 196,000, the weight average molecular weight (Mw) was 637,000 and the Mw/Mn ratio was 3.3.

The polybutadiene obtained was subjected to evaluation of physical properties in the same manner as in Example 1 to obtain the results shown in Tables 5 and 6.

Comparative Example 4

The polybutadiene stated in Example 3 of Japanese Patent Application Kokai (JP-A) Hei 3(1991)-45609 was subjected to evaluation of physical properties in the same manner as in Example 1, to obtain the results shown in Tables 5 and 6.

Comparative Example 5

In the same manner as in Comparative Example 2, except that the amount of boron trifluoride was changed to 9.32 millimoles, the polymerization temperature was changed to 30° C. and the polymerization time was changed to 2 hours, polymerization was conducted to obtain 150 g of a polybutadiene.

The polymerization activity was $0.25\times10^4$ g of polymer/g of Ni·hr, the Mooney viscosity was 60, the cis-1,4 content was 96%, the solution viscosity was 360 cps, the number average molecular weight (Mn) was 245,000, the weight average molecular weight (Mw) was 588,000 and the Mw/Mn ratio was 2.4.

The polybutadiene obtained was subjected to evaluation of physical properties in the same manner as in Example 1 to obtain the results shown in Tables 5 and 6.

Comparative Example 6

In the same manner as in Example 4, except that the amount of boron trifluoride was changed to 1.0 millimole, polymerization was conducted to obtain 420 g of a polybutadiene.

The polymerization activity was $7.77 \times 10^4$ g of polymer/g of Ni·hr, the Mooney viscosity was 105, the cis-1,4 content was 95.2% by weight, the solution viscosity was 420 cps, the number average molecular weight (Mn) was 450,000, the weight average molecular weight (Mw) was 1,560,000 and the Mw/Mn ratio was 3.4.

physical properties of vulcanizate are remarkably deteriorated. Comparative Example 4 is an example in which a polybutadiene rubber containing the 1,2-syndiotactic polybutadiene disclosed in Japanese Patent Application Kokai (JP-A) Hei 3(1991)-45609 was used. In this case, it can be seen that as compared with Examples 1 to 6 of this invention, the physical properties of vulcanizate are deteriorated. Comparative Example 5 is an example in which the Mw/Mn ratio is less than 2.5, and it can be seen therefrom that it is necessary to use a larger amount of the catalyst for obtaining a polymer and the polymerization activity is markedly low. In Comparative Example 6, it can be seen that the Mooney viscosity exceeds 100 and the polybutadiene obtained was not able to be processed and hence was not practical.

TABLE 1

|  |  | Example 1 | Example 2 | Example 3 | Example 4 |
| --- | --- | --- | --- | --- | --- |
| Polymerization conditions |  |  |  |  |  |
| Toluene | (g) | 2,500 | 2,500 | 2,500 | 2,500 |
| 1,3-Butadiene | (g) | 500 | 500 | 500 | 500 |
| (a) Ni naphthenate | (m mole) | 0.046 | 0.046 | 0.046 | 0.046 |
| (b) Boron trifluoride | (m mole) | 0.5 | 0.52 | 0.5 | 0.69 |
| (c) Triethylaluminum | (m mole) | 0.42 | 0.35 | 0.42 | 0.46 |
| (d) Chloranil | (m mole) | 0.07 | 0.07 | 0.023 | 0 |
| (d) 2,3-Dichloro-1,4-naphthoquinone | (m mole) | — | — | — | 0.093 |
| (d) p-Quinone | (m mole) | — | — | — | — |
| (d) Chloral | (m mole) | — | — | — | — |
| (d)/(a) mole ratio |  | 1.5 | 1.5 | 0.5 | 2.0 |
| Polymerization temp. | (°C.) | 60 | 60 | 60 | 60 |
| Polymerization activity (g polymer/gNi · hr) × $10^4$ |  | 8.33 | 7.59 | 8.52 | 8.33 |
| Physical properties of polymer |  |  |  |  |  |
| Mooney viscosity | (MV) | 45 | 63 | 42 | 40 |
| Cis-1,4 content | (%) | 95.5 | 95.8 | 95.5 | 95.4 |
| Solution viscosity (SV) | (cps) | 212 | 511 | 180 | 170 |
| SV/MV |  | 4.7 | 8.1 | 4.3 | 4.2 |
| Number average molecular weight (Mn) | (× $10^4$) | 19.3 | 24.5 | 18.0 | 18.8 |
| Weight average molecular weight (Mw) | (× $10^4$) | 64.6 | 80.6 | 62.0 | 57.3 |
| Molecular weight distribution (Mw/Mn) |  | 3.3 | 3.3 | 3.4 | 3.0 |

The polybutadiene obtained was not able to be kneaded nor evaluated for physical properties.

As is clear from Tables 1 to 6, it can be seen from comparison of Comparative Example 1 with Examples 1, 3 and 6 that by controlling the mole ratio of the component (a) to the component (d), the molecular weight distribution (Mw/Mn) is made small and the branching is made little (SV/MV becomes large), whereby the die swell of the compounded rubber and the physical properties of vulcanizate are improved.

From comparison of Examples 1 to 6 with Comparative Example 3, it can be seen that the molecular properties of the polybutadienes obtained are substantially the same; however, the polymerization activities in the Examples are improved more than 10 times that in Comparative Example 3, and hence, this invention can produce a polybutadiene having a narrow molecular weight distribution and little branching in a high yield.

Moreover, Comparative Example 2 is an example in which the polymerization is conducted using the catalyst in the same amount as in Comparative Example 3. In Comparative Example 2, the Mooney viscosity is only 15 and the

TABLE 2

|  | Example 1 | Example 2 | Example 3 | Example 4 |
| --- | --- | --- | --- | --- |
| Physical properties of compounded rubber |  |  |  |  |
| Mooney viscosity | 49 | 60 | 50 | 44 |
| Die swell (%) | 105 | 107 | 105 | 109 |
| Physical properties of vulcanizate |  |  |  |  |
| $M_{300}$ (kgf/cm$^2$) | 79 | 85 | 80 | 78 |
| $T_B$ (kgf/cm$^2$) | 191 | 195 | 185 | 184 |
| $E_B$ (%) | 610 | 600 | 610 | 620 |
| Impact resilience (%) | 71 | 73 | 70 | 71 |
| Abrasion resistance index | 105 | 109 | 103 | 109 |

TABLE 3

|  |  | Example 5 | Example 6 | Example 7 | Comp. Ex. 1 |
|---|---|---|---|---|---|
| Polymerization conditions |  |  |  |  |  |
| Toluene | (g) | 2,500 | 2,500 | 2,500 | 2,500 |
| 1,3-Butadiene | (g) | 500 | 500 | 500 | 500 |
| (a) Ni naphthenate | (m mole) | 0.046 | 0.046 | 0.046 | 0.046 |
| (b) Boron trifluoride | (m mole) | 0.5 | 0.5 | 0.5 | 0.5 |
| (c) Triethylaluminum | (m mole) | 0.35 | 0.42 | 0.42 | 0.42 |
| (d) Chloranil | (m mole) | — | 0.09 | — | — |
| (d) 2,3-Dichloro-1,4-naphthoquinone | (m mole) | — | — | — | — |
| (d) p-Quinone | (m mole) | 0.28 | — | — | — |
| (d) Chloral | (m mole) | — | — | 0.07 | — |
| (d)/(a) mole ratio |  | 6.1 | 2.0 | 0 | 0 |
| Polymerization temp. | (°C.) | 60 | 60 | 60 | 60 |
| Polymerization activity (g polymer/gNi · hr) × $10^4$ |  | 7.22 | 8.15 | 4.63 | 8.7 |
| Physical properties of polymer |  |  |  |  |  |
| Mooney viscosity | (MV) | 51 | 42 | 62 | 44 |
| Cis-1,4 content | (%) | 95.4 | 95.5 | 95.8 | 95.5 |
| Solution viscosity (SV) | (cps) | 230 | 170 | 500 | 150 |
| SV/MV |  | 4.5 | 4.0 | 8.1 | 3.4 |
| Number average molecular weight (Mn) | (× $10^4$) | 20.7 | 17.0 | 26.2 | 14.4 |
| Weight average molecular weight (Mw) | (× $10^4$) | 68.6 | 54.0 | 78.6 | 58.0 |
| Molecular weight distribution (Mw/Mn) |  | 3.3 | 3.2 | 3.0 | 4.0 |

TABLE 4

|  | Example 5 | Example 6 | Example 7 | Comp. Ex. 1 |
|---|---|---|---|---|
| Physical properties of compounded rubber |  |  |  |  |
| Mooney viscosity | 53 | 50 | 57 | 45 |
| Die swell (%) | 106 | 107 | 108 | 100 |
| Physical properties of vulcanizate |  |  |  |  |
| $M_{300}$ (kgf/cm$^2$) | 81 | 80 | 83 | 82 |
| $T_B$ (kgf/cm$^2$) | 192 | 190 | 195 | 191 |
| $E_B$ (%) | 610 | 620 | 590 | 580 |
| Impact resilience (%) | 72 | 73 | 73 | 70 |
| Abrasion resistance index | 104 | 108 | 110 | 100 |

TABLE 5

|  |  | Comparative Example | | | | |
|---|---|---|---|---|---|---|
|  |  | 2 | 3 | 4 | 5 | 6 |
| Polymerization conditions |  |  |  |  |  |  |
| Toluene | (g) | 2,500 | 2,500 | — | 2,500 | 2,500 |
| 1,3-Butadiene | (g) | 500 | 500 | — | 500 | 500 |
| (a) Ni naphthenate | (m mole) | 0.51 | 0.51 | — | 0.51 | 0.046 |
| (b) Boron trifluoride | (m mole) | 5.54 | 10.0 | — | 9.32 | 1.0 |
| (c) Triethylaluminum | (m mole) | 4.66 | 1.66 | — | 4.66 | 0.46 |
| (d) Chloranil | (m mole) | 0.776 | 1.66*[1] | — | 0.776 | — |
| (d) 2,3-Dichloro-1,4-naphthoquinone | (m mole) | — | 1.66*[2] | — | — | 0.093 |

TABLE 5-continued

|  |  | Comparative Example | | | | |
|---|---|---|---|---|---|---|
|  |  | 2 | 3 | 4 | 5 | 6 |
| (d)/(a) mole ratio |  | 1.5 | — | — | 1.5 | 2.0 |
| Polymerization temp. | (°C.) | 60 | 60 | — | 30 | 60 |
| Polymerization activity (g polymer/gNi · hr) × $10^4$ |  | 9.26 | 0.7 | — | 0.25 | 7.77 |
| Physical properties of polymer |  |  |  |  |  |  |
| Mooney viscosity | (MV) | 15 | 44 | 38 | 60 | 105 |
| Cis-1,4 content | (%) | 95.2 | 95.5 | 92.5 | 96.0 | 95.2 |
| Solution viscosity (SV) | (cps) | 75 | 214 | 116 | 360 | 420 |
| SV/MV |  | 5.0 | 4.9 | 3.1 | 6.0 | 4.0 |
| Number average molecular weight (Mn) | (× $10^4$) | 6.6 | 19.6 | 12.1 | 24.5 | 45.0 |
| Weight average molecular weight (Mw) | (× $10^4$) | 20.5 | 63.7 | 44.4 | 58.8 | 156.0 |
| Molecular weight distribution (Mw/Mn) |  | 3.1 | 3.3 | 3.7 | 2.4 | 3.4 |

*1: Triisobutylalminium hydride
*2: 2-Ethylhexyl alcohol

TABLE 6

|  | Comparative Example | | | | |
|---|---|---|---|---|---|
|  | 2 | 3 | 4 | 5 | 6 |
| Physical properties of compounded rubber |  |  |  |  |  |
| Mooney viscosity | 20 | 50 | 44 | 66 | Physical properties in processing was not able to be evaluated |
| Die swell (%) | 115 | 103 | 99 | 107 |  |
| Physical properties of vulcanizate |  |  |  |  |  |
| $M_{300}$ (kgf/cm$^2$) | 50 | 84 | 78 | 83 |  |
| $T_B$ (kgf/cm$^2$) | 140 | 199 | 199 | 200 |  |
| $E_B$ (%) | 63 | 73 | 68 | 74 |  |
| Abrasion resistance index | 85 | 102 | 95 | 113 |  |

What is claimed is:

1. A process for producing a polybutadiene rubber having a cis-1,4 content of 94% or more and a ratio of weight average molecular weight to number average molecular weight of 2.5 to 3.5 as measured by a gel permeation chromatography and a Mooney viscosity ($ML_{1+4}$, 100° C.) of 20 to 100, which comprises polymerizing 1,3-butadiene in an inert organic solvent with a catalyst comprising as the main components (a) a nickel compound; (b) at least one fluorine compound selected from the group consisting of (1) hydrogen fluoride or its complex compounds, (2) boron trifluoride or its complex compounds, (3) triphenylmethyl hexafluorophosphate, (4) triphenylmethylhexafluoroantimonate and (5) metal salts of tetrafluoroboric acid; (c) a trialkylaluminum; and (d) at least one compound selected from the group consisting of halogenated aldehydes and quinone compounds.

2. The production process according to claim 1, wherein the nickel compound is an organonickel compound soluble in an inert organic solvent.

3. The production process according to claim 1, wherein the nickel compound is an organic acid salt of nickel.

4. The production process according to claim 1, wherein the hydrogen fluoride or its complex compound (b)(1) is benzonitrile hydrogenfluoride.

5. The production process according to claim 1, wherein the boron trifluoride or its complex compound (b)(2) is selected from the group consisting of boron trifluoride ethyl etherate and boron trifluoride butyl etherate.

6. The production process according to claim 1, wherein the metal salt of tetrafluoroboric acid is nickel tetrafluoroborate.

7. The production process according to claim 1, wherein the trialkylaluminum (c) is selected from the group consisting of trimethylaluminum, triethylaluminum, triisobutylaluminum, tri-n-butylaluminum and trihexylaluminum.

8. The production process according to claim 1, wherein the halogenated aldehyde is selected from the group consisting of acetyl chloride, butyryl chloride and chloral.

9. The production process according to claim 1, wherein the quinone compound (d) is selected from the group consisting of chloranil, tetrafluorobenzoquinone, p-quinone, naphthoquinone, anthraquinone, 2,3-dichloro-1,4-naphthoquinone and 2,3-dichloro-5,6-dicyanobenzoquinone.

10. The production process according to claim 1, wherein the amount of the nickel compound (a) used is 0.01 to 1 millimole as the metal atom per 100 g of the 1,3-butadiene.

11. The production process according to claim 1, wherein the amount of the component (b) used is 0.05 to 20 millimoles as the metal atom per 100 g of the 1,3-butadiene.

12. The production process according to claim 1, wherein the amount of the trialkylaluminum (c) used is 0.05 to 10 millimoles as the metal atom per 100 g of the 1,3-butadiene.

13. The production process according to claim 1, wherein the amount of the component (d) used is 0.01 to 10 millimoles as the metal atom per 100 g of the 1,3-butadiene.

14. The production process according to claim 1, wherein the mole ratio of the component (d) to the component (a) is in the range of 0.5 to 10.

15. The production process according to claim 1, wherein the inert organic solvent is selected from the group consisting of aromatic hydrocarbon solvents, aliphatic hydrocarbon solvents and alicyclic hydrocarbon solvents.

16. The production process according to claim 1, wherein the inert organic hydrocarbon solvent is selected from the group consisting of n-hexane, n-heptane, cyclohexane, toluene and xylene.

17. The production process according to claim 1, wherein the polymerization temperature is 20 to 100° C., the polymerization pressure is 0 to 5 atmospheres (gauge pressure), the concentration of the monomer in the solvent is 5 to 50% by weight.

18. The production process according to claim 1, wherein the polybutadiene has a ratio of solution viscosity (SV) as measured in the form of a 5.23% by weight toluene solution to Mooney viscosity (MV) ($ML_{1+4}$, 100° C.) of 4 or more.

19. The production process according to claim 1, wherein the polybutadiene has a Mooney viscosity ($ML_{1+4}$, 100° C.) in the range of 30 to 70.

* * * * *